United States Patent Office 3,217,065
Patented Nov. 9, 1965

3,217,065
LAMINATED STRUCTURES
Louis M. Higashi, San Jose, Calif., assignor to
Monsanto Company, a corporation of Delaware
No Drawing. Filed Dec. 16, 1960, Ser. No. 76,125
2 Claims. (Cl. 260—826)

This invention relates to laminated structures having good resistance to elevated temperatures and to methods for preparing same.

There is growing interest in employing thermoset resin-bonded, fiber-reinforced laminates in applications where high strength and resistance to degradation at high temperatures are required. Typical of the applications in which such laminates are employed are structural members of high speed aircraft, nose cones of ballistic missiles, etc. While considerable know-how has been developed as to methods for preparing such laminates so that they will retain a high percentage of their strength after long exposure to high temperatures, there is a pressing need for laminates which have still better resistance to prolonged exposures at high temperatures.

It is an object of this invention to provide thermoset resin-bonded, fiber-reinforced laminates having a high degree of resistance to degradation at elevated temperatures.

Another object of this invention is to provide novel thermosetting resins which can be employed in preparing thermoset resin-bonded, fiber-reinforced laminates.

Other objects and advantages of this invention will be apparent from the following detailed description thereof.

The above and related objects are attained by impregnating a reinforcing web with a particular thermosetting resin and curing the adsorbed resin to a thermoset condition at an elevated temperature. The resin employed to impregnate the web consists of a ternary co-condensate of (a) a particular methoxy-silicone compound, (b) a particular phenol-formaldehyde resin, and (c) a glycidyl polyether of bisphenol-A.

The following examples are set forth to illustrate more clearly the principle and practice of this invention to those skilled in the art. Where parts or quantities are mentioned, they are parts or quantities by weight unless otherwise specified.

EXAMPLE I

Part A

A mixture of 100 parts (about 1.06 mol) of phenol, 38 parts (about 1.15 mol) of 91% paraformaldehyde and 0.8 part of oxalic acid dihydrate are charged to a stirred autoclave equipped with a reflux condenser. The reaction mixture, which has a pH of about 1.5, is refluxed under vacuum at 90° C. for about 90 minutes, by which time the quantity of free formaldehyde present is reduced to about 11.5 weight percent. The reaction mixture is then cooled to about 45° C. and 7.5 parts of a 28% aqueous ammonia solution and 2 parts of hexamethylene tetramine are added. The reaction mixture, which now has a pH of about 8.7, is again refluxed, under a pressure of about 3.5 inches of mercury, removing water until a batch temperature of 90° C. is attained and the quantity of free formaldehyde present is reduced to about 3 weight percent. Approximately 20 parts of water are removed in this step. The resin solution is then dehydrated by adding 28 parts of anhydrous isopropanol and azeotroping the mixture under a pressure of about 3.5 inches of mercury until the batch temperature reaches 90° C. Approximately 26 parts of distillate are removed in this step.

Part B

To the reaction mixture of Part A above are added 22 parts (0.06 mol) of a commercially available low molecular weight glycidyl polyether of bisphenol-A and which has an epoxide equivalent weight of about 200. The resulting mixture is heated to a temperature of 90° C. under pressure of about 1 inch of mercury and about 1 part of distillate is recovered. There is then added to the reaction mixture 26 parts (0.13 mol) of phenyltrimethoxysilane. The reaction mixture is distilled under a constant pressure of about 1 inch of mercury until 8.5 parts of distillate are recovered and the take-off temperature increases to about 90° C. This distillate consists predominantly of methanol. The reaction mixture is cooled and sufficient anhydrous isopropanol is added thereto to provide a solution containing about 60% resin solids.

EXAMPLE II

Part A

Sheets of glass cloth (E.C.D.–225–181 finished with gamma-aminopropyltriethoxysilane) are impregnated by dipping the cloth in the resin solution prepared in Example I, Part B and removing the excess resin solution by drawing the cloth over a scraper bar. The impregnated cloth is heated in an oven for about 2 hours at about 90° C. to remove the solvent from the impregnated cloth and to partially advance the resin. The resulting cloth contains about 40% resin solids and about 2% of volatiles.

Part B

A series of laminates ⅛″ thick are prepared from 14 sheets of resin impregnated cloth prepared as described in Part A. The 14 plies of cloth are laid up with the warp running in the same direction in all plies and the assembly is pressed under a pressure of approximately 200 p.s.i. at a temperature of 350° F. for 30 minutes. After being removed from the mold, the laminate is post-cured by being heated in an air-circulating oven in accordance with the following schedule:

24 hours at 250° F.
24 hours at 300° F.
24 hours at 350° F.
8 hours at 400° F.
4 hours at 450° F.
48 hours at 500° F.

These laminates have flexural strengths in the range of from about 70,000 to 90,000 p.s.i. at 75° F. The above and all subsequently reported flexural strength values are measured by Federal Specification L–P–406 Test Method No. 1031.

Part C

The laminates prepared in Part B above are maintained in an air-circulating oven for 100 hours at 600° F. The flexural strengths of the laminates are then determined at 600° F. with values of from about 25,000 to 40,000 p.s.i. being obtained.

EXAMPLE III

Part A

A phenol-formaldehyde resin is prepared in exactly the same manner as described in Example I, Part A.

Part B

A co-condensate of the phenol-formaldehyde resin of Part A above, the glycidyl polyether of bisphenol-A described in Example I, Part B and phenyltrimethoxysilane is prepared in exactly the same manner as described in Example I, Part B except that only 13 parts of the glycidyl polyether of bisphenol-A and only 16 parts of phenyltrimethoxysilane are employed in lieu of the quantities stated in Example I, Part B.

EXAMPLE IV

Part A

Sheets of woven glass cloth (E.C.D.–225–118 finished with gamma-aminopropyltriethoxysilane) are impregnated with the resin of Example III, Part B and heated for two hours at 190° F. to remove the solvent from the impregnated cloth and to partially advance the resin. The resulting cloth contains about 40% resin solids and about 2% of volatiles.

*Part B*

A series of laminates ⅛″ thick are prepared from 14 sheets of resin impregnated cloth prepared as described in Part A above. The pressing and post-curing conditions employed are identical with those set forth in Example II, Part B. These laminates have flexural strengths in the range of from about 65,000 to 85,000 p.s.i. at 75° F.

The laminates prepared above are maintained in an air-circulating oven for 100 hours at 600° F. The flexural strengths of the laminates are then determined at 600° F. with values of from about 22,000 to 35,000 p.s.i. being obtained.

EXAMPLE V

*Part A*

A mixture of 100 parts (about 1.06 mol) of phenol, 38 parts (about 1.15 mol) of 91% paraformaldehyde and 0.9 part of a 0.25% aqueous hydrochloric acid solution are charged to a stirred autoclave equipped with a reflux condenser. The reaction mixture, which has a pH of about 0.5, is refluxed under vacuum at 90° C. for about 90 minutes, by which time the quantity of free formaldehyde present is reduced to about 6.2 weight percent. The reaction mixture is then partially dehydrated by distilling at a pressure of about 3.5 inches of mercury until the boiling point of the reaction mixture falls to about 55° C. Approximately 12 parts of distillate are removed in this step. About 1.1 parts of triethylamine are added, bringing the reaction mixture to a pH of about 8. The reaction mixture is again refluxed, under vacuum, at a temperature of 80° C. for about 40 minutes, by which time the quantity of free formaldehyde present is reduced to about 4.7 weight percent. The resin solution is then dehydrated by adding 37 parts of anhydrous propanol and azeotroping the mixture under a pressure of about 3.5 inches of mercury until the batch temperature reaches 90° C.

*Part B*

A ternary co-condensation product of the reaction mixture of Part A above, a glycidyl ether of bisphenol-A, and phenyltrimethoxysilane is prepared as in Example I, Part B. A series of laminates prepared as in Example II, Parts A and B and tested as in Part C thereof exhibit 600° F. flexural strengths of from about 25,000 to 45,000 p.s.i. after being maintained at 600° F. for 100 hours.

The laminates of the present invention are prepared by impregnating a reinforcing web with a novel co-condensation product of (a) a particular methoxysilicone compound, (b) a particular phenol-formaldehyde resin, and (c) a glycidyl polyether of bisphenol-A, subjecting the resin impregnated reinforcing web to pressure and curing the resin at an elevated temperature.

The reinforcing webs employed herein may be cloths, batts or rovings of glass fibers, metal filaments, asbestos, polyacrylonitrile filaments, nylon filaments, or filaments of similar high-melting materials. As is known, the reinforcing web should be treated with a suitable finishing agent to obtain good adhesion between the reinforcing web and the resin. Scores of suitable finishing agents are known in the art (see the Society of Plastics Engineering Journal 13, pages 42–46, August 1957, which is incorporated herein by reference) and are exemplified by such materials as gamma-aminopropyltriethoxysilane and Werner type compounds formed between chromium compounds and methacrylic acid as represented by the Volan bonding agents supplied by the E. I. du Pont Co.

In preparing the laminates the reinforcing web is impregnated with a solution of the resin and heated at low temperatures, e.g., not substantially above about 200° F., to advance the resin and to reduce the volatiles content of the resin to the order of 2–8%, depending primarily upon the pressing conditions that are to be subsequently employed. In most cases it is desirable to impregnate the web so that it contains about 30–50% and more especially about 35–45% of resin solids. Thereafter, a plurality of plies of the resin impregnated webs are laid up and pressed for about 30–60 minutes at an elevated temperature, e.g., 250–400° F., to bond the plies and cure the resin. Thereafter, it is preferred practice to post-cure the laminate by heating it for a period of at least about 15 hours at a temperature of about 250–600° F. Usually the temperature will be slowly increased during the post-curing step from an initial temperature of at least 250° F. to a final temperature of at least 500° F. The post-curing operation can be carried out in an air-circulating oven but preferably is carried out in a high boiling liquid that is chemically inert to the laminate or in an oven that is blanketed with an inert gas such as nitrogen or carbon dioxide.

When the laminates are to be molded at low pressures of the order of about 14 p.s.i., as by the popular vacuum bag molding method, the plies of the reinforcing web should contain about 35–40% resin solids and the volatiles content of the resin should be about 4–8%. A typical pressing cycle is as follows:

10 minutes at 275° F.
20 minutes at 325° F.
30 minutes at 350° F.

To obtain optimum heat resistant properties the laminates should be post-cured substantially in accordance with the following schedule:

8 hours at 350° F.
8 hours at 375° F.
4 hours at 400° F.
2 hours at 450° F.
1 hour at 500° F.
1 hour at 600° F.

When the laminates are to be molded at higher pressures, e.g., at a pressure of the order of 200 p.s.i., the plies of the reinforcing web should contain about 40–45% resin solids and have a volatiles content of about 2.5–4.5%. The laminates can be cured by pressing for about 30 minutes at 350° F. or for about 60 minutes at 250° F. To obtain optimum heat resistant properties the laminates should be post-cured substantially in accordance with the following schedule:

24 hours at 250° F. (optional)
24 hours at 300° F.
24 hours at 350° F.
8 hours at 400° F.
4 hours at 450° F.
48 hours at 500° F.

The heat resistant properties of the laminates can be further improved by coating the laminates with the co-condensation product of the methoxysilicone compound, the phenol-formaldehyde resin and the glycidyl polyether of bisphenol-A before the laminates are post-cured. In this embodiment of the invention, the laminate is prepared as described above and the surface of the laminate is then impregnated with the co-condensation product by any suitable means such as roll-coating, brushing, spraying, etc. In general, however, it is preferred to dip the laminate in the resin solution for a period of at least 2 and preferably at least 5 minutes to insure maximum penetration of the resin into the laminate. The adsorbed resin is then cured to a thermoset condition at an elevated temperature, e.g., by heating for 2–12 hours at a temperature of about 180–210° F. The laminate is then post-cured in accordance with one of the heating schedules set forth earlier herein.

The resins employed in the invention are co-condensation products of (a) about 2–30% and preferably about 12-18% of a particular methoxysilicone compound, (b) about 50-96% and preferably about 65-80% of a particular phenol-formaldehyde resin, and (c) about 2-20% and preferably about 10-15% of a glycidyl polyether of bisphenol-A, the sum of (a), (b) and (c) totaling 100%. The co-condensation products can be prepared by simply heating a substantially anhydrous mixture of the three resin moieties to reflux temperature and removing the methanol that is liberated in the reaction. It is preferred to run the co-condensation reaction under reduced pressure, e.g., less than about 4 and especially less than 2 inches of mercury. If desired, the phenol-formaldehyde resin can be first reacted with the glycidyl polyether of bisphenol-A and the resulting binary co-condensation product can then be further reacted with the methoxysilicone compound. Alternatively, a binary co-condensation product can be first prepared from the phenol-formaldehyde resin and the methoxysilicone compound and the resulting binary co-condensate can then be reacted with the glycidyl polyether of bisphenol-A. After being prepared, the co-condensation products are preferably diluted to 40-70% resin solids with an anhydrous low boiling acyclic alcohol containing 1-4 carbon atoms, e.g., methanol, ethanol, n-propanol, isopropanol, ethylene glycol, or the like.

The methoxysilicone compound moiety of the co-condensation product can be either a methoxysilane or a methoxypolysiloxane. The methoxysilanes that can be employed conform to the following formula:

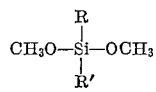

where R is an aryl group and R' is a methoxy group, an aryl group or an alkyl group containing up to 4 carbon atoms. Typical examples of such methoxysilanes include diphenyldimethoxysilane, ditolyldimethoxysilane, phenylmethyldimethoxysilane or preferably phenyltrimethoxysilane. The methoxypolysiloxanes that can be employed conform to the formula:

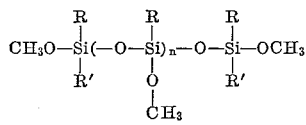

where R is an aryl group, R' is a methoxy group, an aryl group or an alkyl group containing up to 4 carbon atoms, and $n$ has a value of 0, 1 or 2. In lieu of a single methoxy silicone compound it is feasible to employ mixtures of two or more methoxysilanes, mixtures of two or more methoxypolysiloxanes or mixtures of at least one methoxysilane with at least one methoxypolysiloxane. Both the methoxysilanes and the methoxypolysiloxanes are commercially available compounds whose methods of preparation are well-known in the art and, accordingly, are not set forth herein.

The glycidyl polyether of bisphenol-A moiety of the co-condensation product is one of the well-known commercially available glycidyl polyethers which are obtained by reacting epichlorohydrin with bisphenol-A. The glycidyl polyethers, instead of being a single simple compound, are generally a complex mixture of glycidyl polyethers, but the principal product may be represented by the formula:

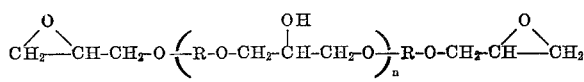

wherein $n$ is an integer of the series 0, 1, 2, . . . and R represents the divalent hydrocarbon radical of bisphenol-A. While for any single molecule of the glycidyl polyether $n$ is an integer, the fact that the obtained glycidyl polyether is a mixture of compounds causes the determined value of $n$, e.g., from molecular weight measurement, to be an average which is not necessarily zero or a whole number. In addition, although the glycidyl polyether is a substance primarily of the above formula, it may contain some material with one or both of the terminal glycidyl radicals in hydrated form.

The glycidyl polyethers employed may have epoxide equivalent weights, i.e., the grams of material required to provide 1 gram equivalent of epoxide, of from about 170 to about 4,000 or even higher. It is preferred, however, to employ relatively low molecular weight glycidyl polyethers which have epoxide equivalent weights of less than about 600. Typical of the preferred glycidyl polyethers are the products sold by the Shell Chemical Company under the trade names Epon 828, Epon 834, Epon 864 and Epon 1001. For a more detailed description of the structure of the glycidyl polyethers of bisphenol-A and the methods employed for preparing same, see U.S. 2,640,037.

The phenol-formaldehyde resin moiety of the novel co-condensation products of this invention is prepared by reacting 1 molar proportion of phenol with from 1.04 to 1.24 molar proportions of formaldehyde under acid conditions to a first critical end-point, then under alkaline conditions to a final critical end-point. The formaldehyde employed may be in aqueous solution such as formalin, but preferably is in the form of paraformaldehyde. In a preferred embodiment, the molar proportion of formaldehyde to phenol is in the range of from 1.14:1 to 1.18:1.

The initial condensation is effected under acid conditions, i.e., at a pH of from 0.3 to 3, until the proportion of free formaldehyde remaining in the reaction mixture is in the range of from 5 to 12 weight percent, based upon total formaldehyde charged. In this step, the essential factors affecting the efficacy of the ultimate resin are the pH of the system and the percentage of free formaldehyde remaining at the end of the step. Therefore, any organic or mineral acid capable of affecting the desired pH may be employed. Oxalic acid and hydrochloric acid have been shown in the examples but may be replaced with equivalent results, with such acids or acid salts as, for example, phenol sulfonic acid, toluene sulfonic acid, sulfuric acid, sulfurous acid, phosphoric and phosphorus acids, formic acid, glacial acetic acid, lactic acid, boron trichloride, phosphorous trichloride, silicon tetrachloride, titanium tetrachloride, aluminum chloride. Mixtures of the same may also be used.

The condensation is concluded under alkaline conditions, i.e., at a pH of from 7.5 to 9.2, until the proportion of free formaldehyde present in the reaction mixture is in the range of from 3 to 5 weight percent, based upon total formaldehyde. Again, the essential factors in this step are pH and the final percentage of free formaldehyde. Thus, a wide range of organic and inorganic bases may be employed. Ammonia and hexamethylene tetramine in combination as well as triethylamine have been shown in the examples. However, other bases which may be used in place thereof with equivalent results include, for example: ammonia; morpholine; N-methyl morpholine, piperazine, tertiary amines such as trimethylamine, tri-n-propylamine, triisobutylamine, triphenylamine, etc.; hexamethylene tetramine; tetraalkyl ammonium hydroxides such as tetramethyl ammonium hydroxide; alkaline earth and alkali metal hydroxides such as lithium hydroxide, potassium hydroxide, sodium hydroxide, barium hydroxide, etc.; etc. Mixtures of such bases may be employed when desired. When alkaline earth or alkali metal cations are present in the resinous system because of the use of bases containing the same, it is preferred to remove such cations, using, for example, conventional techniques such as precipitation thereof as an insoluble salt followed by filtration, etc.

While not necessarily a limiting factor, practical considerations balancing speed of reaction with adequate control over the reaction lead to the use of a temperature range of from about 80 to 90° C. during both the acid and alkaline condensation steps. Control and adjustment of vacuum or pressure within the reaction system will allow the practitioner to maintain any temperature or temperature cycle he may desire to use. For example, the condensation may, at the practitioner's option, be conducted at constant temperature, e.g., from 60 to 110° C., or at varying temperatures according to a predetermined cycle. The criticality of the aforementioned pH ranges, on both the acid and basic sides, are a matter of control of the rate of the reaction. The criticality of the percentages of free formaldehyde remaining at the endpoint of the acid-condensation step and that remaining in the final phenol-formaldehyde resin moiety has been mentioned. The reasons for such criticality at the endpoint of the acid step are not fully understood and will not be speculated upon. However, with regard to the requirement that the final phenol-formaldehyde resin moiety contain from 3 to 5 weight percent of free formaldehyde, it has been observed that at below 3% the resin is so far advanced that final cure of the laminate prepared from the co-condensation product thereof with the methoxysilicone compound fails to fully develop the high temperature strength sought, whereas at above 5% said final cure proceeds at a slower rate with a resulting loss of sufficient of the free formaldehyde to again prevent full development of the high temperature properties of the laminate. However, it should be emphasized that while the specified range of from 3 to 5 weight percent free formaldehyde is necessary to provide the maximum high temperature properties required for exacting missile and high speed aircraft applications, co-condensate resins of higher or lower free formaldehyde content may be similarly fabricated into laminates intended for use in less exacting applications.

In preparing the laminates of the invention it is sometimes desirable to include a small quantity of a polybasic organic acid or an anhydride thereof in the co-condensate resin. These organic acids and their anhydrides serve to assist in cross-linking and hardening the co-condensate within the web and thus provide more heat resistant laminates. Typical examples of such acids and their anhydrides include mellitic acid, mellitic anhydride, chlorendic acid, chlorendic anhydride, phthalic acid, phthalic anhydride, terephthalic acid, adipic acid, and the like. An especially preferred material for this purpose is the dianhydride of pyromellitic acid. When employed, such organic acids and their anhydrides will be employed in the quantities of about 0.2–10 parts and preferably 1–3 parts per 100 parts of the co-condensate resin.

The laminates of the invention can be employed as structural members and particularly as structural members in high-speed aircraft, nose cones of ballistic missiles, etc. and in other applications which require laminates which retain a high percentage of their strength after long exposures to high temperatures.

The above descriptions and particularly the examples are set forth for purposes of illustration only. Many other variations and modifications thereof will be apparent to those skilled in the art and can be made without departing from the spirit and scope of the invention herein described.

What is claimed is:

1. A method for preparing a co-condensation product which consists essentially of heating a substantially anhydrous mixture of (a) about 2–30% of a methoxysilicone compound, (b) about 50–96% of a phenol-formaldehyde resin, and (c) about 2–20% of a glycidyl polyether of bisphenol-A to reflux temperature under reduced pressure and removing the methanol liberated in the reaction; the sum of (a), (b) and (c) totaling 100%; said methoxysilicone compound being selected from the group consisting of (a) at least one methoxysilane of the formula:

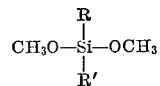

where R is an aryl group and R' is selected from the group consisting of a methoxy group, an aryl group, and an alkyl group containing up to 4 carbon atoms, (b) at least one methoxypolysiloxane of the formula:

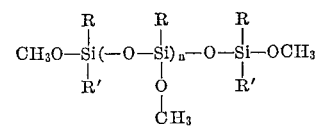

where R is an aryl group, R' is selected from the group consisting of a methoxy group, an aryl group and an alkyl group containing up to 4 carbon atoms and $n$ is an integer having a value of 0–2, and (c) mixtures (a) and (b); said phenol-formaldehyde resin having been prepared by reacting 1 molar proportion of phenol with from 1.04 to 1.24 molar proportions of formaldehyde at a pH of from 0.3 to 3 until the proportion of free formaldehyde present is reduced to a level of from 5 to 12 weight percent, based upon total formaldehyde charged, adjusting the reaction mixture to a pH of from 7.5 to 9.2, and further reacting until the proportion of free formaldehyde present is reduced to a level of from 3 to 5 weight percent, based upon total formaldehyde charged.

2. A heat reaction product of (a) about 2–30% of a methoxysilicone compound, (b) about 50–96% of a phenol-formaldehyde resin, and (c) about 2–20% of a glycidyl polyether of bisphenol-A, the sum of (a), (b) and (c) totaling 100%; said methoxysilicone compound being selected from the group consisting of (a) at least one methoxysilane of the formula:

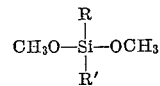

where R is an aryl group and R' is selected from the group consisting of a methoxy group, an aryl group, and an alkyl group containing up to 4 carbon atoms, (b) at least one methoxypolysiloxane of the formula:

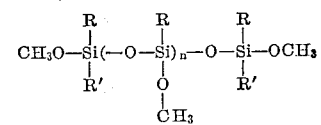

where R is an aryl group, R' is selected from the group consisting of a methoxy group, an aryl group and an alkyl group containing up to 4 carbon atoms and $n$ is an integer having a value of 0–2, and (c) mixtures of (a) and (b); said phenolformaldehyde resin having been prepared by reacting 1 molar proportion of phenol with from 1.04 to 1.24 molar proportions of formaldehyde at a pH of from 0.3 to 3 until the proportion of free formaldehyde present is reduced to a level of from 5 to 12 weight percent, based upon total formaldehyde charged, adjusting the reaction mixture to a pH of from 7.5 to 9.2, and further reacting until the proportion of free formaldehyde present is reduced to a level of from 3 to 5 weight percent, based upon total formaldehyde charged.

References Cited by the Examiner

UNITED STATES PATENTS

| | | | |
|---|---|---|---|
| 2,473,145 | 6/49 | Hesselbart | 260—57 |
| 2,687,396 | 8/54 | McLean | 260—44 |
| 2,810,674 | 10/57 | Madden | 154—140 |
| 2,901,337 | 8/59 | Keutgen et al. | 260—59 XR |

EARL M. BERGERT, *Primary Examiner.*

CARL F. KRAFFT, *Examiner.*